May 13, 1924.

F. E. SMALL

PISTON PACKING

Filed July 12, 1921

Frank E. Small INVENTOR

BY Emery, Varney, Blair + Moquet ATTORNEYS

Patented May 13, 1924.

1,494,140

UNITED STATES PATENT OFFICE.

FRANK E. SMALL, OF JAMAICA, NEW YORK.

PISTON PACKING.

Application filed July 12, 1921. Serial No. 484,090.

*To all whom it may concern:*

Be it known that I, FRANK E. SMALL, a citizen of the United States, and a resident of Jamaica, Queens County, New York, have invented an Improvement in Piston Packings, of which the following is a specification.

My present invention relates to piston packings, particularly, but not exclusively, for pistons for internal combustion engines. It is an object of the present invention to provide a piston packing which is of superior quality and excellence, while at the same time being cheaper than other piston packings intended for the same use for which the piston packing of my invention is particularly adapted. It is a further object of the present invention to provide a piston packing of the general character referred to above which may be more readily and conveniently shipped, and which will be less likely to become dislodged from the piston groove than piston packings hitherto devised for the same general use.

By way of example I shall in the accompanying specification set forth two illustrative embodiments of the piston packing of my invention, it being clearly understood, however, that my invention is not limited to the particular embodiments thereof which are herein set forth for purposes of illustration only.

While the various features included in the aforesaid embodiments of my invention may be embodied in various types of piston packings, my invention finds particularly successful application in connection with piston packings of the type shown in United States patents numbered 1,129,910 and 1,173,319. In these patents there are shown several types of piston packings comprising in each case, however, a split packing ring divided at a single point and having a beveled surface at its inner side and a spring follower ring engaging the beveled surface of the packing ring and one wall of the piston groove. In certain forms the piston packing of the two patents referred to above comprises an insert ring inserted in a groove in the packing ring and so arranged as to break the joint in said packing ring to minimize leakage around the ring through the piston groove. The rings of these patents, while much superior to any other type of ring now known to me, are somewhat expensive and are sometimes inconvenient to handle, since there is a tendency for the spring follower ring to jump out of the piston groove due to the action of the spring follower ring on the split packing ring.

The piston packing of my present invention while possessing all of the desirable features of the piston packings described in the two patents referred to above, avoids certain of the disadvantageous features of the piston packings of these patents, in that I provide a ring of simpler construction, which is much cheaper to manufacture, and I also provide means to retain the follower ring in the piston groove against the normal tendency of such follower ring to jump out of the piston groove after expanding the packing ring a sufficient amount.

In the accompanying drawings I have illustrated several illustrative embodiments of my invention, in which drawings—

Figure 1:
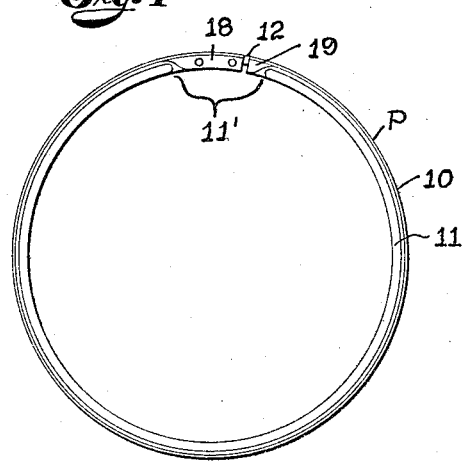
Figure 1 is a bottom plan view.
Figure 2:
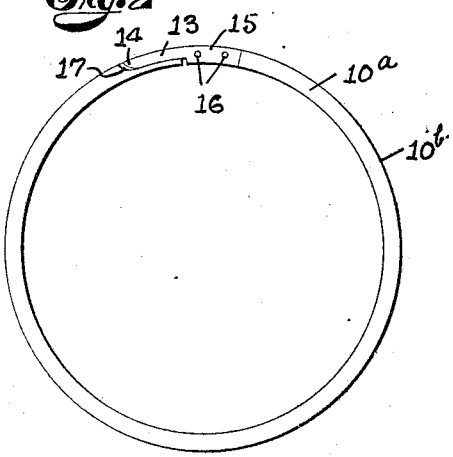
Figure 2 is a top plan view.
Figure 3:
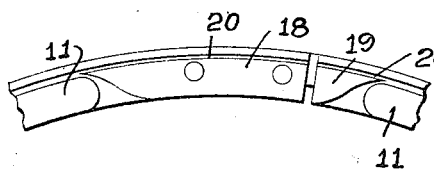
Figure 3 is an enlarged detail view in bottom elevation.

Referring to the drawings, P represents generally the piston packing of my present invention, said packing comprising in the embodiment here illustrated a packing ring 10 and a spring follower ring or expander 11. The packing ring 10 is preferably divided at a single point 12. Otherwise the ring 10 is continuous and is resilient and normally tends to expand by its own resiliency.

At 13 I have shown a joint-breaking member which is preferably attached to or integral with one end of the ring 10 adjacent the split or joint 12. For this purpose the joint-breaking member 13 is provided with a tongue 14 which forms an extension of the portion 15 which is suitably attached to the end of the ring 10 referred to, as by the rivets 16. The tongue 14 extends part way across the width of the face 10ª of the ring 10, which face I shall designate for convenience as the upper face of the ring 10. The tongue 13 also extends part way across the width of the face 10ᵇ of the ring 10, which face I shall for convenience designate as the outer face of the ring.

Cooperating with the tongue 13 and so shaped as to receive and properly seat said tongue is a groove or depression 17 in the other end of the ring 10 adjacent the joint or split 12. The groove or seat 17 is shaped to more or less accurately receive the tongue 13. That is, the groove 17 extends part way across the width of the upper face 10ª and also of the outer face 10ᵇ of the ring 10. It will thus be noted that I have in a simple and ingenious manner provided a ring which is split at a single point but which also carries a joint-breaking member substantially comprising a continuation of the circumference of the ring.

Figure 6:
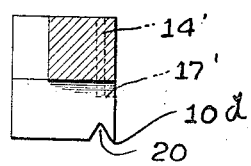
Figure 6 is an enlarged cross sectional view of another embodiment taken in the position corresponding to the line 6—6 in Figure 5.

While such a ring may be used with great success and to great advantage in many types of piston packings, I prefer to combine this ring with a spring follower ring or expander 11 as described above, and as shown in the drawings. For this purpose I prefer to provide the inner face of the ring 10, here designated for convenience by reference character 10ᶜ, with a beveled edge or surface, as shown more clearly in Figure 7 of the drawings. It will thus be noted that the lower face 10ᵈ of the ring 10 is rather narrow and almost an edge. This is particularly desirable where the ring is used in inverted form to serve as an oil ring. For this purpose I prefer to notch or groove the abutments 18 and 19, hereinafter described, as shown in Figures 6 and 8 of the drawing, so that the lower edge 10ᵈ of the ring will have a continuous sharp outer edge to more efficiently serve as an oil ring. The groove in the abutments 18 and 19 is indicated by the reference character 20.

For the purpose of properly positioning the spring follower ring or expander 11, which is here shown as being of segmental circular cross section, and as provided with a gap 11', as shown more clearly in Figure 1 of the drawing, I provide the abutments 18 and 19 already referred to. These abutments serve to position the expander ring 11 against circumferential displacement. The abutment 18 constitutes a portion of the ring 10 under the part 15 of the joint-breaking member 13. The abutment 19 constitutes a portion of the ring 10 to the other side of the joint 12 from the abutment 18.

Figure 4:
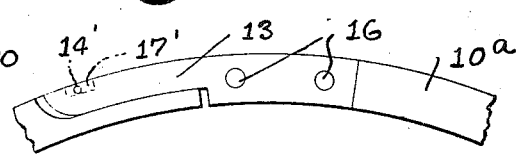
Figure 4 is an enlarged detail view in top elevation.
Figure 5:
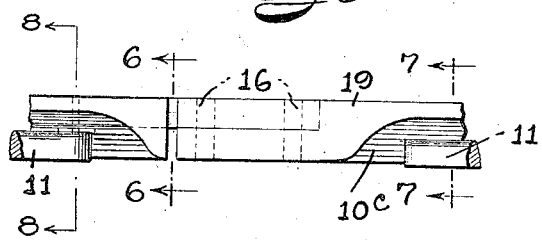
Figure 5 is an enlarged detail view in side elevation of one of said embodiments.
Figure 7:
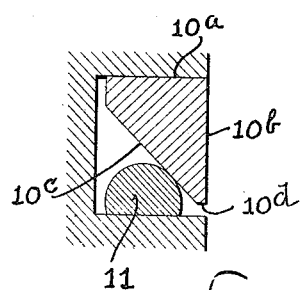
Figure 7 is an enlarged cross sectional view showing the piston packing in the groove and taken along the line 7—7 in Figure 5.
Figure 8:
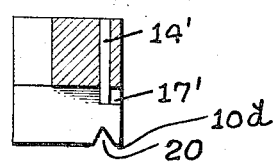
Figure 8 is an enlarged cross sectional view of the embodiment shown in Figure 6 of the drawing and taken along the line 8—8 in Figure 5.

It frequently happens that under the action of the follower ring or expander 11, which ring is highly resilient and tends to expand by its own resiliency, the packing ring 10 which is acted upon by the expander ring 11 at the beveled surface or inner face 10ᶜ, as shown more clearly in Figure 7 of the drawing, is opened sufficiently at the joint 12 to permit the expander ring 11 to jump out of the cylinder groove in which the packing ring is placed. This is possible since according to the present embodiment the packing ring 10 is substantially narrower in width than the width of the groove. In order to prevent this from happening, with consequent inconvenience in manipulating the rings in the grooves on the piston, I prefer to provide suitable locking means for locking the ends of the ring sufficiently to prevent the joint 12 from being opened so wide under the action of the spring follower or expander ring 11 to permit the latter ring and particularly its free ends to jump out of the piston grooves. While various locking means may be used for this purpose, I prefer to use the means illustrated comprising in the present instance a pin 14' at the under face of the tongue 13 and fitting into a groove 17' cut into the lower face of the groove 17 from the outer side of the ring 10 as well as from the lower face of the groove, as more clearly shown in Figure 4 of the drawing. The groove 17' is preferably only about the same width and depth as the diameter of the pin 14' but is of a length sufficient to give enough free play for the desired expansion and contraction of the ring in use. However, the length of the groove 17' is so chosen that the ring 10 under the action of the expander ring 11 is permitted to expand such a distance only as will not make the joint or split 12 large enough to permit the ring 11, and particularly the free ends thereof, to jump out of the piston groove.

The manner of utilizing the ring disclosed above will be quite clear from the foregoing description. Since the cylinder groove is narrower than the width of the packing ring the ring may be readily inserted. Due to the provision of the joint-breaking member 13, a single piece ring is provided which substantially prevents undesirable leakages. Furthermore, due to the provision of the locking means, the split ring 10 is not permitted to expand a distance great enough to permit the spring follower ring 11 or the ends thereof to jump out of the piston groove. Other advantages of the foregoing construction will be apparent to those skilled in the art, such advantages all combining to provide a ring which, while simple in construction, is highly efficient in operation and is highly convenient to insert and to maintain in its groove against accidental displacement.

It is of course to be understood that my invention is not limited to the particular embodiments thereof which are herein shown and described for purposes of illustration only.

What I claim is:

1. In a packing for pistons, a resilient split ring, a spring follower adapted to be seated in a piston groove with, and to cooperate with said ring, means to permit diametrical expansion of said ring without separation of the ends thereof, positive means to prevent separation of the ends of the ring, said permitting means comprising a tongue at one end of the ring adapted to slide in a recess in the other end of said ring, and said preventing means comprising a pin positioned in one end of said ring and adapted to slide in a slot in the other end of said ring.

2. In a packing for pistons, a resilient split ring, said ring having a beveled inner surface throughout the greater portion of its length, abutments formed on the inner surface of said ring at the ends of said beveled portion, and a penannular spring follower adapted to be seated against the beveled surface of the ring between said abutments.

In testimony whereof, I have signed my name to this specification this 1st day of July, 1921.

FRANK E. SMALL.